(12) United States Patent
Lin et al.

(10) Patent No.: US 10,935,711 B2
(45) Date of Patent: Mar. 2, 2021

(54) LIGHT GUIDE PLATE FOR AN ELECTRONIC PAPER DISPLAY, AND THE ELECTRONIC PAPER DISPLAY

(71) Applicant: Guangzhou OED Technologies, Inc., Guangdong (CN)

(72) Inventors: Yongqiang Lin, Guangzhou (CN); Jingquan Sun, Guangzhou (CN)

(73) Assignee: Guangzhou OED Technologies, INC., Guangzhou (CN)

(*) Notice: Subject to any disclaimer, the term of this patent is extended or adjusted under 35 U.S.C. 154(b) by 0 days.

(21) Appl. No.: 15/120,477

(22) PCT Filed: Feb. 11, 2015

(86) PCT No.: PCT/CN2015/072720
§ 371 (c)(1),
(2) Date: Aug. 19, 2016

(87) PCT Pub. No.: WO2015/124074
PCT Pub. Date: Aug. 27, 2015

(65) Prior Publication Data
US 2017/0068037 A1    Mar. 9, 2017

(30) Foreign Application Priority Data
Feb. 19, 2014    (CN) .......................... 201410056571.7

(51) Int. Cl.
*G02B 6/00* (2006.01)
*F21V 8/00* (2006.01)
(Continued)

(52) U.S. Cl.
CPC ......... *G02B 6/0016* (2013.01); *G02B 6/0021* (2013.01); *G02F 1/133603* (2013.01);
(Continued)

(58) Field of Classification Search
CPC .. G02B 6/0016; G02B 6/0021; G02B 6/0081; G02B 6/0068; G02F 1/133603; G02F 1/167; G02F 1/1677; G02F 2001/133607
(Continued)

(56) References Cited

U.S. PATENT DOCUMENTS 6,601,962 B1 *   8/2003   Ehara ................... G02B 6/0016
                                                            362/558
7,513,813 B2 †   4/2009   Paolini
(Continued)

FOREIGN PATENT DOCUMENTS

CN          1886621 A      12/2006
CN          1886621 A       6/2009
(Continued)

OTHER PUBLICATIONS

International Search Report and Written Opinion for PCT/CN2015/072720 filed Feb. 11, 2015, dated May 6, 2015 (23 pages) (English Translation).
(Continued)

*Primary Examiner* — Matthew Mikels
(74) *Attorney, Agent, or Firm* — Treasure IP Group, LLC

(57) ABSTRACT

The present invention provides a light guide plate (30) for an electronic paper display and the electronic paper display. The light guide plate (30) is arranged above a display surface of an electrophoretic display module (10), and it comprises a main body, wherein a tooth-shaped pattern is arranged on an in-light surface (33) of the main body. The electrophoretic display module (10) comprises a microcapsule electrophoretic display module or a microcup electrophoretic display module. The tooth-shaped pattern is formed by a plurality of arc-shaped projections (331), arc-shaped recesses (332), angle-shaped projections, or angle-shaped recesses (333). The tooth-shaped pattern provides the in-
(Continued)

light surface (33) with in-light angles of multiple directions, which greatly diffuse light beam that enters the light guide plate (30), thereby avoiding appearance of a dark area (B1, B2, B3) in an in-light position of the display area (90), so as to provide a more evenly distributed luminance in the display area (90) and thus provides a better lighting effect.

11 Claims, 11 Drawing Sheets

(51) Int. Cl.
  *G02F 1/167* (2019.01)
  *G02F 1/13357* (2006.01)
  *G02F 1/1677* (2019.01)
(52) U.S. Cl.
  CPC ............ *G02F 1/167* (2013.01); *G02F 1/1677* (2019.01); *G02B 6/0068* (2013.01); *G02B 6/0081* (2013.01); *G02F 2001/133607* (2013.01)
(58) Field of Classification Search
  USPC .................................................. 362/608–609
  See application file for complete search history.

(56) References Cited

U.S. PATENT DOCUMENTS

| | | | |
|---|---|---|---|
| 2002/0101399 | A1 | 8/2002 | Kubo et al. |
| 2006/0209563 | A1 | 9/2006 | Hirota et al. |
| 2007/0274100 | A1 | 11/2007 | Yang et al. |
| 2012/0051093 | A1† | 3/2012 | Kanade |
| 2012/0250348 | A1 | 10/2012 | Kim et al. |
| 2012/0294034 | A1* | 11/2012 | Kim ........................ G02B 6/002 362/606 |
| 2013/0063968 | A1* | 3/2013 | Neugebauer ......... G02B 6/0043 362/603 |
| 2013/0063969 | A1* | 3/2013 | Neugebauer ......... G02B 6/0036 362/603 |
| 2013/0258705 | A1 | 10/2013 | Pao et al. |
| 2013/0293596 | A1* | 11/2013 | Atkins ................. G09G 3/3413 345/690 |
| 2014/0055418 | A1* | 2/2014 | Hsieh ...................... G06F 3/042 345/175 |
| 2014/0104816 | A1* | 4/2014 | Takasi ...................... F21V 7/24 362/97.3 |
| 2014/0192557 | A1* | 7/2014 | Lu ........................... G09F 13/14 362/612 |

FOREIGN PATENT DOCUMENTS

| | | |
|---|---|---|
| CN | 102279436 A | 12/2011 |
| CN | 102279498 A | 12/2011 |
| CN | 102563466 | 7/2012 |
| CN | 103363440 A | 10/2013 |
| CN | 103631450 A | 3/2014 |
| CN | 203732748 U | 7/2014 |
| CN | 203732852 U | 7/2014 |
| CN | 203849531 U | 9/2014 |
| EP | 1688665 | 8/2006 |
| JP | 10-199316 | 7/1998 |

OTHER PUBLICATIONS

Extended European Search Report for EP 15752879.5 dated Oct. 16, 2017 (9 pages).
Kindle Paperwhite (6$^{th}$ Generation), Sep. 2013 (13 pages).
Third Party Observations of Jan. 19, 2018 (76 pages).
"Which Kindle E-reader do I have?"; retrieved from www.amazon. com/gp/help/customer/dispay.html/?nodeID-201263790 dated Dec. 12, 2017, 6 pages.
B. Johnson, "How the Kindle Paperwhite Works", Amazon "Kindle", Mar. 25, 2013 retrived from www.amazon.com/gp/product/B007HCCNJU/ (16 pages).
"Frontlight", Wikipedia, retrieved from http://en.wikipeida.org/wiki/Frontlight, Nov. 27, 2018 (1 page).
Communication pursuant to Rule 114(2) EPC dated Jun. 12, 2019 for EP Appln. No. 15752879.5, 10 pages.
Heater, "Amazon Kindle Paperwhite Review" Engadget, Sep. 30, 2012, https://www.engadget.com/2012/09/30/amazon-kindle-paperwhite-review/.
"Light Reading: How the Kindle Paperwhite Works", NY Times, Dec. 26, 2012, http://www.nytimes.com/interactive/2012/12/26/technology/light-reading.html?ref=personaltech&_r=2&.

\* cited by examiner
† cited by third party

LIGHT GUIDE PLATE FOR AN ELECTRONIC PAPER DISPLAY, AND THE ELECTRONIC PAPER DISPLAY

CROSS-REFERENCE TO RELATED APPLICATIONS

This application is a U.S. National Stage Application under 35 U.S.C. § 371 of International Application No. PCT/CN2015/072720, filed Feb. 11, 2015, which application claims priority to Chinese Patent Application No. 201410056571.7 filed Feb. 19, 2014, the content of each of which is hereby incorporated by reference in its entirety.

FIELD OF THE INVENTION

The present invention relates to frontlight technology for an electronic paper display and in particular, to a light guide plate for an electronic paper display and the electronic paper display.

BACKGROUND OF THE INVENTION

An electronic paper reader is a reflective reader and generally uses frontlight technology. As shown in FIG. 1, in the frontlight technology, a light guide plate 30' and LEDs 60' are arranged above a display surface of a display module of an electronic paper. A side emitting LED is generally used in the frontlight technology to make the device light and thin. The LEDs 60' are arranged outside of an in-light surface 33' of the light guide plate 30', separated by a layer of air from the light guide plate 30'. The in-light side of the light guide plate 30', i.e., the in-light surface 33', is a flat surface. Light emitted from the LEDs enters the air, and then enters the light guide plate 30' by refraction of the in-light surface 33' of the light guide plate 30'.

On one hand, since the light guide plate is arranged above the display module of the electronic paper, its luminance does not need to be too high as compared to that in backlight technology. On the other hand, in order to save cost and reduce power consumption, in current frontlight technology, the number of LEDs is generally reduced to a number as small as possible, which leads to a large distance between adjacent LEDs. In this case, a bright area A' is formed right in front of the LEDs, and a dark area B' is formed right in front of the area between the adjacent LEDs.

Since the space above the display module of the electronic paper is limited, the distance between the LEDs and the display area 90' can not be too large. Thus the distance for mixing light is insufficient, which leads to a too large dark area B' which therefore covers part of the display area 90' that is close to the in-light side. Thus there appears a dark spot in the in-light side of the display area, which causes an unevenly distributed luminance in the in-light side and therefore affects reading.

SUMMARY OF THE INVENTION

To overcome disadvantages in prior art, an object of the present invention is to provide a light guide plate for an electronic paper display, which provides a better light guiding effect and an evenly distributed luminance in an in-light position of its display surface.

Another object of the present invention is to provide an electronic paper display, which provides a better light guiding effect and an evenly distributed luminance in an in-light position of its display surface.

To achieve one of the above objects, the present invention provides a light guide plate for an electronic paper display. The light guide plate is adapted to be arranged above a display surface of an electrophoretic display module, wherein the light guide plate comprises a main body, and a tooth-shaped pattern is arranged on an in-light surface (from this surface the light come in) of the main body.

The electrophoretic display module may comprise a microcapsule electrophoretic display module, or a microcup electrophoretic display module.

The tooth-shaped pattern may be a regular or irregular shape formed by consecutive or inconsecutive recesses and/or projections arranged on the in-light surface of the main body of the light guide plate.

In a preferable embodiment, the tooth-shaped pattern is formed by a plurality of arc-shaped projections, a plurality of arc-shaped recesses, a plurality of angle-shaped projections, or a plurality of angle-shaped recesses.

In a preferable embodiment, the width of the arc-shaped projections, arc-shaped recesses, angle-shaped projections, or angle-shaped recesses is in a range of 0.1-0.5 mm. This range of width provides a good mixing effect for the light that enters the light guide plate, and also provides an evenly distributed luminance.

In a further preferable embodiment, the width of the arc-shaped projections, arc-shaped recesses, angle-shaped projections, or angle-shaped recesses is in a range of 0.2-0.3 mm. This range of width provides a better mixing effect for the light that enters the light guide plate, and also provides a more evenly distributed luminance.

In a preferable embodiment, the height of the arc-shaped projections, arc-shaped recesses, angle-shaped projections, or angle-shaped recesses is in a range of 0.05-0.25 mm. This range of height provides a good mixing effect for the light that enters the light guide plate, and also provides an evenly distributed luminance.

In a further preferable embodiment, the height of the arc-shaped projections, arc-shaped recesses, angle-shaped projections, or angle-shaped recesses is in a range of 0.1-0.15 mm. This range of height provides a better mixing effect for the light that enters the light guide plate, and also provides a more evenly distributed luminance.

In a preferable embodiment, the distance between two adjacent arc-shaped projections, arc-shaped recesses, angle-shaped projections, or angle-shaped recesses is in a range of 0-0.5 mm. This range provides a good mixing effect for the light that enters the light guide plate, and also provides an evenly distributed luminance.

In a preferable embodiment, the main body of the light guide plate extends into a LEDs area, and the main body is provided with recesses for receiving LEDs.

To achieve another of the above objects, the present invention provides an electronic paper display, which comprises an electrophoretic display module, a light guide plate, and a frontlight device arranged on the electrophoretic display module, wherein the light guide plate is any of the light guide plates described above.

In a preferable embodiment, the electrophoretic display module comprises successively a substrate layer, a microcapsule electrophoretic display layer, and a transparent electrode layer.

Compared to prior art, the tooth-shaped pattern arranged on the in-light surface of the light guide plate provides the in-light surface with in-light angles of multiple directions, which greatly diffuse reflected light beam that enters the light guide plate, thereby avoiding appearance of a dark area in an in-light position of the display area, so as to provide a

LIST OF REFERENCE NUMBERS

10: electrophoretic display module;
11: substrate layer;
12: microcapsule electrophoretic display layer;
13: transparent electrode layer;
20: OCA layer;
30: light guide plate;
31: recess;
32: edge of the recess;
33: in-light surface;
331: arc-shaped projection;
332: arc-shaped recess;
333: angle-shaped recess;
40: adhesive layer;
50: driving circuit board;
60: LED;
61: housing of LED;
62: lightening element of LED;
90: display area;
91: in-light position;
100: LED area;
A1, A2, A3: bright area;
B1, B2, B3: dark area.

DETAILED DESCRIPTION OF THE INVENTION

Detailed descriptions of the present invention will now be given according to specific examples, reference being made to the accompanying drawings, to facilitate a skilled person in the art to better understand and enforce the present invention. However, the specific examples are not intended to be limiting the present invention.

Figure 1:
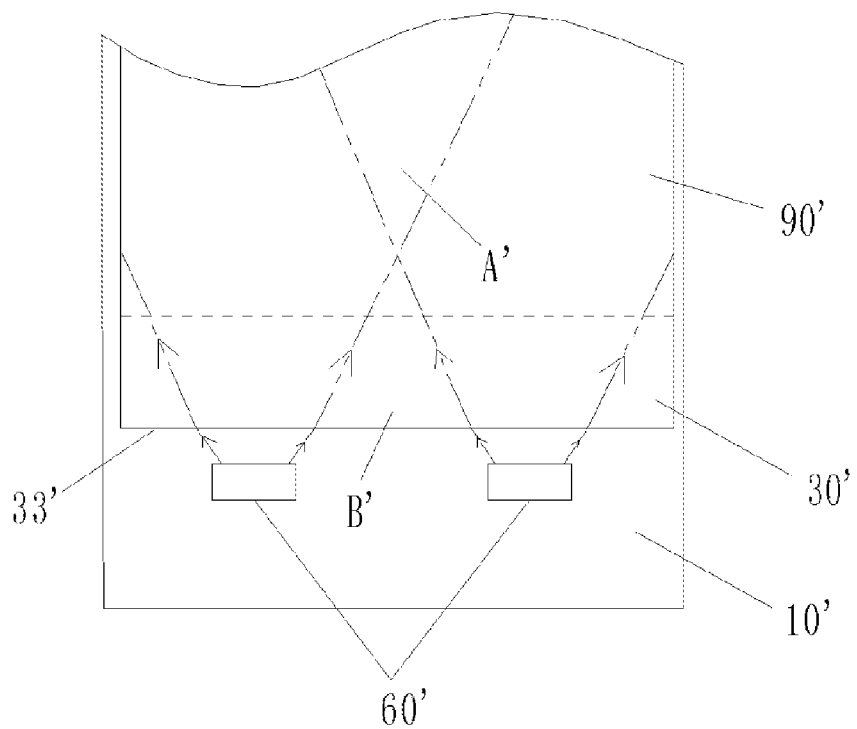
FIG. 1 shows the effect of a frontlight technology of an electronic paper display in prior art.
Figure 2:
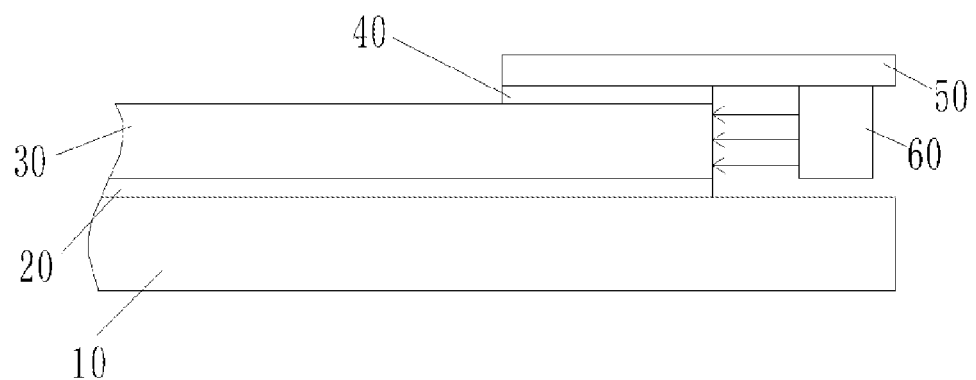
FIG. 2 shows the structure of a frontlight electronic paper display according to a preferable embodiment of the present invention.

An electronic paper display is shown in FIGS. 2-5. FIG. 2 shows the structure of a frontlight electronic paper display according to a preferable embodiment of the present invention. The electronic paper display comprises an electronic paper display module 10, an OCA (optical clear adhesive) layer 20, a light guide plate 30, an adhesive layer 40, a driving circuit board 50, and LEDs 60. The light guide plate 30 is arranged on a display surface of the electronic paper display module 10. The OCA layer 20 is arranged between the electronic paper display module 10 and the light guide plate 30, for attaching the light guide plate 30 to the display surface of the electronic paper display module 10. One end of the driving circuit board 50 is attached to the light guide plate 30 through the adhesive layer 40, while the other end of it serves for installing LEDs 60.

Figure 10:
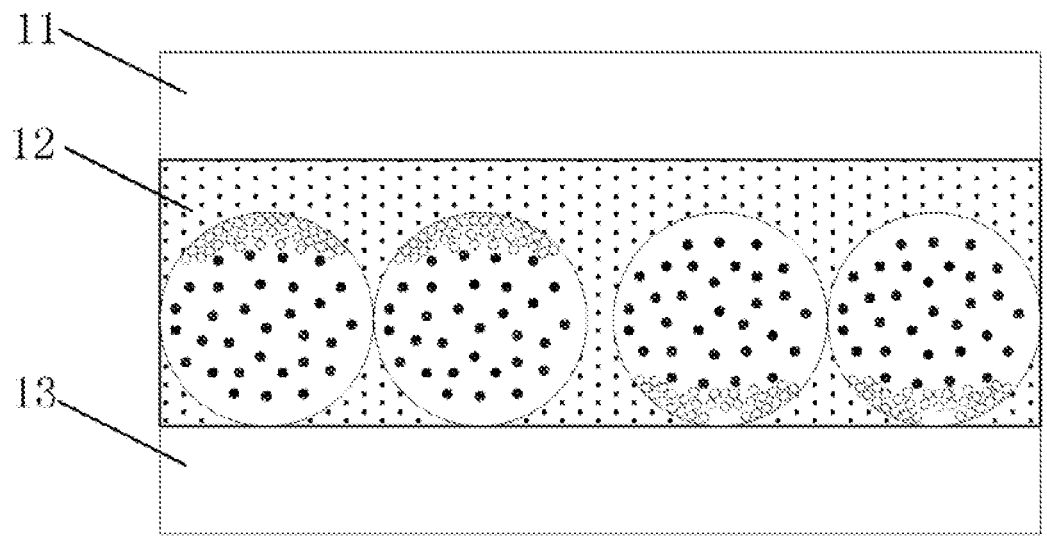
FIG. 10 shows the structure of an electrophoretic display module according to a preferable embodiment of the present invention.

The electrophoretic display module 10 can be a reflective display module such as a microcapsule electrophoretic display module, a microcup electrophoretic display module, and the like. In the case of a microcapsule electrophoretic display module, as shown in FIG. 10, the microcapsule electrophoretic display module comprises successively a substrate layer 11, a microcapsule electrophoretic display layer 12, and a transparent electrode layer 13. The microcapsule electrophoretic display layer is a solid electrophoretic display layer. The substrate layer 11 comprises a plurality of pixel electrodes and can be a substrate layer of TFT glass. The microcapsule electrophoretic display layer 12 capsules therein a transparent electrophoretic ink, particles of one color carrying a positive charge or a negative charge, and neutral particles of another color. Under a driving voltage applied between the substrate layer 11 and the transparent electrode layer 13, the charged pigment particles are moved in the microcapsules to display. Of course, in other examples, the microcapsule electrophoretic display layer 12 capsules therein a transparent electrophoretic ink, particles of one color carrying a positive charge, and particles of another color carrying a negative charge, wherein the charged particles are moved in the microcapsules to display under a driving voltage.

The OCA layer 20 is used for bonding the light guide plate 30 with the electrophoretic display module 10. The optical adhesive used in the OCA layer 20 is required to be colorless and transparent, and it also needs to have a light transmittance of more than 90%, a good bonding strength, and capability of solidifying under room temperature or intermediate temperate with a small shrinkage during solidification. Adhesives such as organic silicon rubber, carboxyl resin and unsaturated polyester, polyurethane, epoxy resin and the like can be used to bond optical elements. Treating agents are generally added during preparation to improve optical property or to reduce shrinkage rate.

The light guide plate 30 is an optical grade acrylic PMMA/PC plate. Light guide spots can be printed on surface of the optical grade acrylic PMMA/PC plate using high refractive materials and UV screen printing technology. A light guide plate 30 having inwardly or outwardly extending light guide spots can be manufactured by an injection molding of an injection molding machine. Light emitted from LEDs enters inner of the light guide plate 30, which is then transmitted to an distal end by total reflection between two surfaces of the light guide plate, wherein when the light reaches the light guide spots, the light will goes out of the surface of the light guide plate due to destruction of total reflection condition, such that the light guide plate gives out light evenly by light guide spots that are designed to be variable in size and density.

The adhesive layer 40 is used for bonding the light guide plate 30 with the driving circuit board 50.

Figure 3:
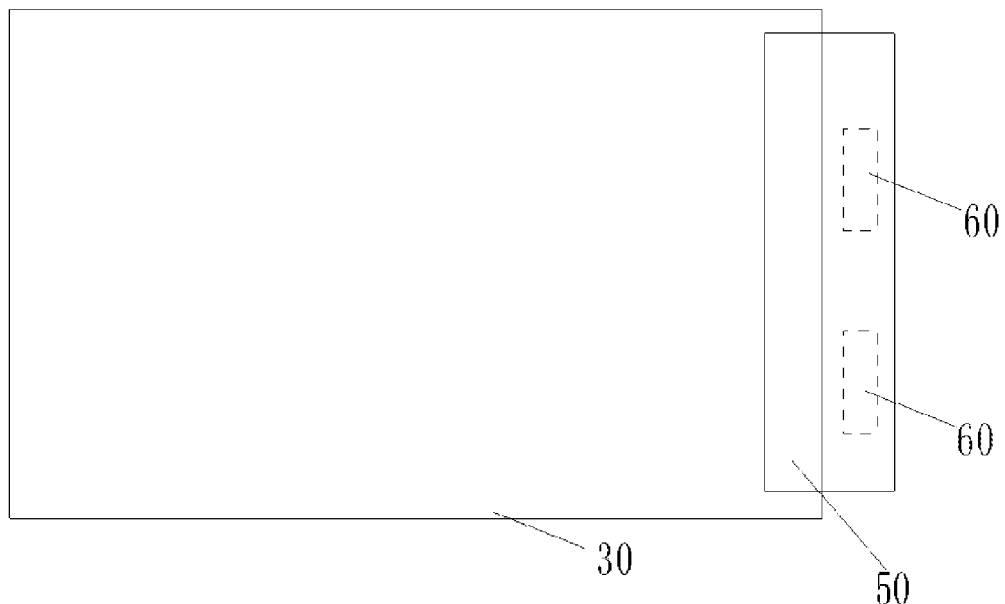
FIG. 3 shows the structure of the frontlight device in FIG. 2.
Figure 4:
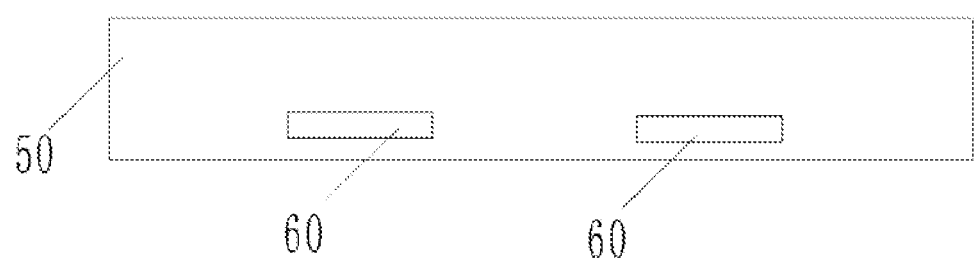
FIG. 4 shows the structure of a light bar according to a preferable embodiment of the present invention.

As shown in FIG. 3, the light guide plate 30, the driving circuit board 50, and the LEDs 60 together form a frontlight device of the electronic paper display. As shown in FIG. 4, a light bar is formed by one or more LEDs 60 weld on the driving circuit board 50. The driving circuit board 50 is a flexible printed circuit board for driving LEDs, and is attached to the light guide plate 30 through the adhesive layer 40.

Figure 5:
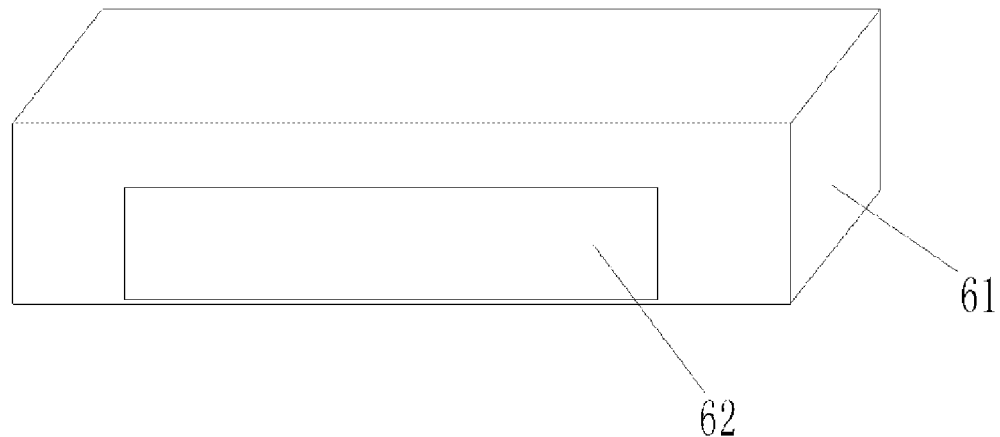
FIG. 5 shows the structure of a side emitting LED according to a preferable embodiment of the present invention.

As shown in FIGS. 2 and 5, the LED 60 is a LED that emits light from its side. The LED comprises a lightening element 62 that is connected with the driving circuit board 50, and a housing 61 that receives the lightening element 62. The housing 61 is provided with a light outlet on its side that is close to the in-light surface 33 of the light guide plate 30. When the lightening element 62 is powered on, it gives out light which goes toward the in-light surface 33 of the light guide plate 30 through the light outlet on the side of the housing 61.

As shown in FIGS. 11-14, in one embodiment of the light guide plate of the electronic paper display, the light guide plate 30 is provided with a tooth-shaped pattern on the in-light surface 33 of its main body. The tooth-shaped pattern is formed by a plurality of arc-shaped projections 331. The plurality of arc-shaped projections 331 have a consistent shape and size, and are regularly arranged on the in-light surface 33, which facilitates incoming light beam to uniformly entry the light guide plate through the in-light surface 33.

The height h of the arc-shaped projections 331 may be provided in the range of 0.05-0.25 mm, for example, 0.05 mm, 0.1 mm, 0.12 mm, 0.15 mm, 0.2 mm, 0.25 mm, and the like, and preferably in the range of 0.1-0.15 mm. The width L of the arc-shaped projections 331 may be provided in the range of 0.1-0.5 mm, for example, 0.1 mm, 0.2 mm, 0.25 mm, 0.3 mm, 0.4 mm, and the like, and preferably in the range of 0.2-0.3 mm. The distance between two adjacent arc-shaped projections 331 may be provided in the range of 0-0.5 mm, for example, 0 mm, 0.05 mm, 0.1 mm, 0.12 mm, 0.15 mm, 0.2 mm, 0.25 mm, 0.3 mm, 0.4 mm, 0.5 mm, and the like, and preferably in the range of 0-0.1 mm.

Figure 11:
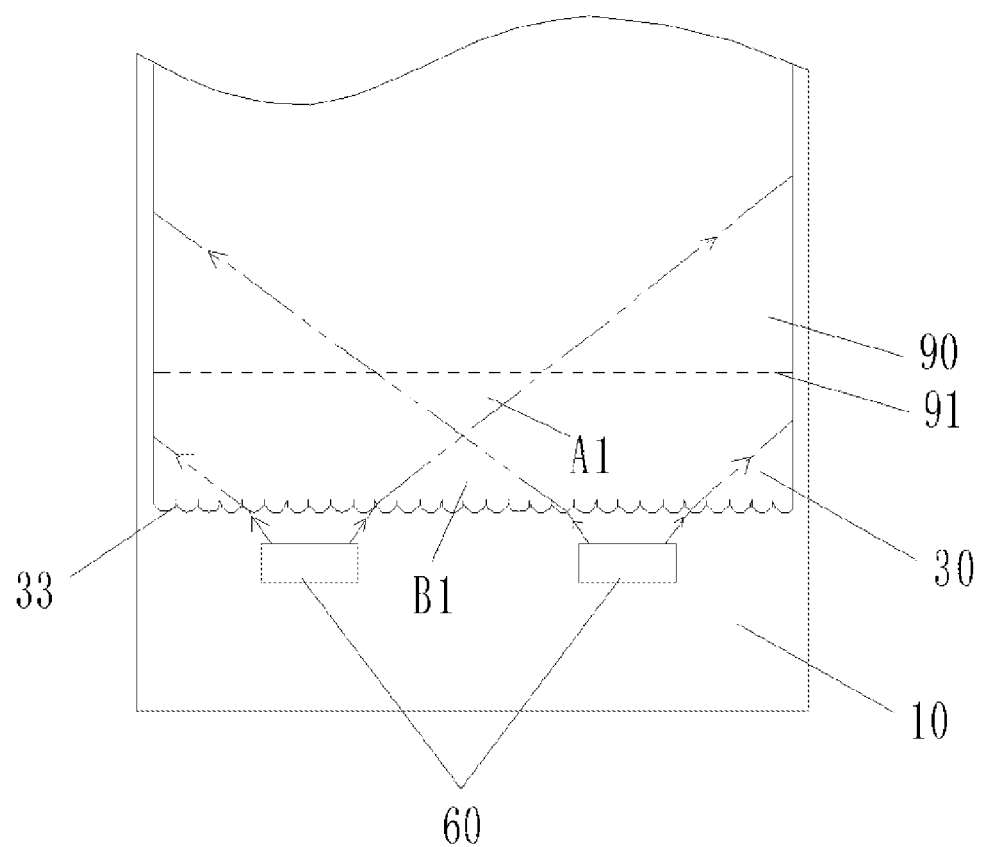
FIG. 11 shows the frontlight effect of a frontlight electronic paper display according to a preferable embodiment of the present invention.
Figure 12:
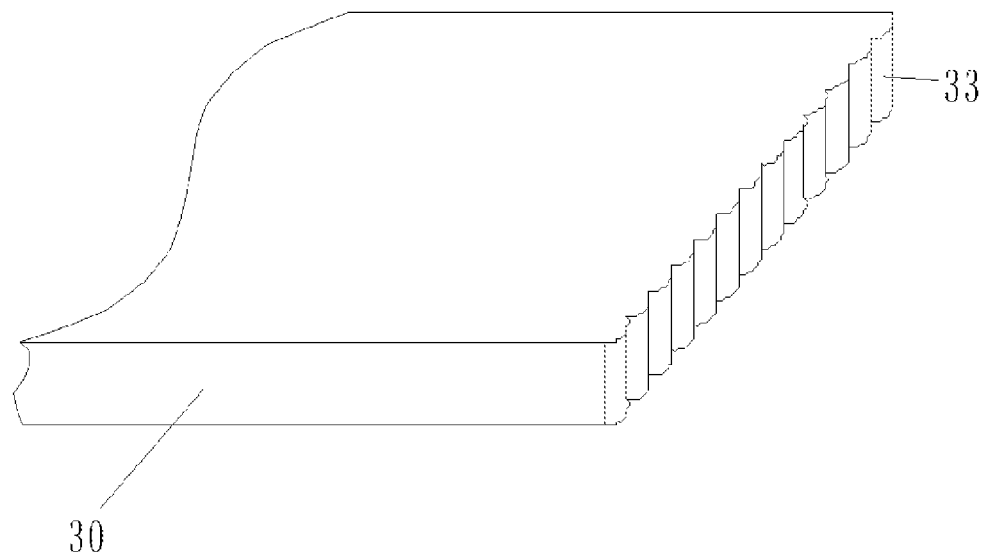
FIG. 12 shows the structure of a light guide plate according to a preferable embodiment of the present invention.
Figure 13:
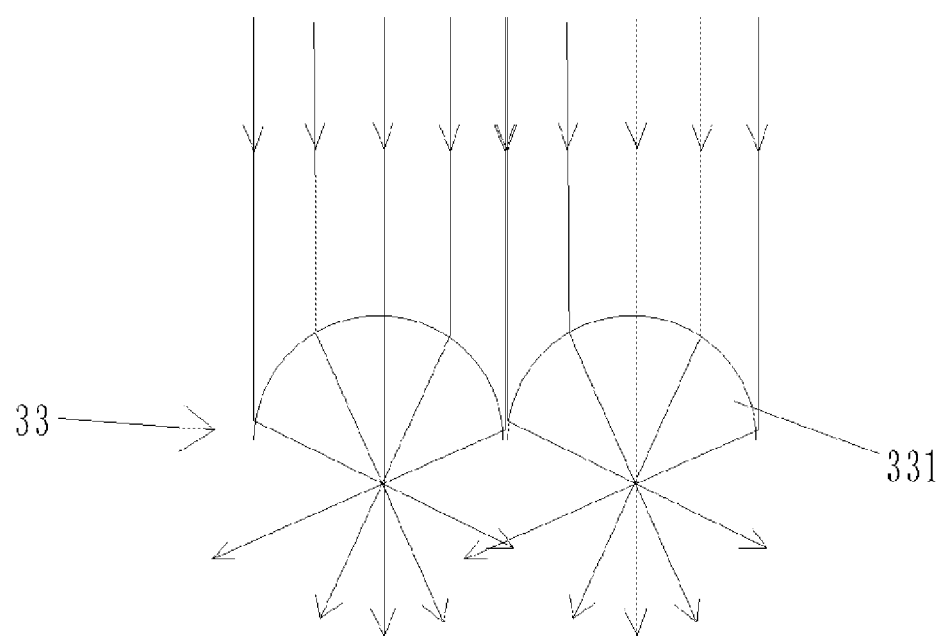
FIG. 13 shows the in-light effect of an in-light surface of the light guide plate in FIG. 12.

As shown in FIGS. 11 and 13, display area 90 of the electronic paper display is bounded by a dotted line in FIG. 11, which represents an in-light position 91 of the display area 90. The arc-shaped projections 331 causes light beam to form multiple incident angles on the in-light surface, which leads to different refraction angles and therefore makes the light beam to aggregate inside the light guide plate and then diverge again. In such a way, the light beam that entered the light guide plate 30 is greatly diffused, which effectively reduces dark area B1, making the dark area B1 away from the display area 90, and enlarges light area A1, making the display area 90 completely inside the light area A1. Therefore, no dark area will appear at the in-light position 91 of an edge of the display area 90 that is close to the in-light surface, thereby providing a better frontlight illumination, and a better display effect in the display area.

As shown in FIGS. 15-18, in another embodiment of the light guide plate of the electronic paper display, the light guide plate 30 is provided with a tooth-shaped pattern on the in-light surface 33 of its main body. The tooth-shaped pattern is formed by a plurality of arc-shaped recesses 332. The plurality of arc-shaped recesses 332 have a consistent shape and size, and are regularly arranged on the in-light surface 33, which facilitates incoming light beam to uniformly entry the light guide plate through the in-light surface 33.

The height h of the arc-shaped recesses 332 may be provided in the range of 0.05-0.25 mm, for example, 0.05 mm, 0.1 mm, 0.12 mm, 0.15 mm, 0.2 mm, 0.25 mm, and the like, and preferably in the range of 0.1-0.15 mm. The width L of the arc-shaped recesses 332 may be provided in the range of 0.1-0.5 mm, for example, 0.1 mm, 0.2 mm, 0.25 mm, 0.3 mm, 0.4 mm, and the like, and preferably in the range of 0.2-0.3 mm. The distance between two adjacent arc-shaped recesses 332 may be provided in the range of 0-0.5 mm, for example, 0 mm, 0.05 mm, 0.1 mm, 0.12 mm, 0.15 mm, 0.2 mm, 0.25 mm, 0.3 mm, 0.4 mm, 0.5 mm, and the like, and preferably in the range of 0-0.1 mm.

Figure 15:
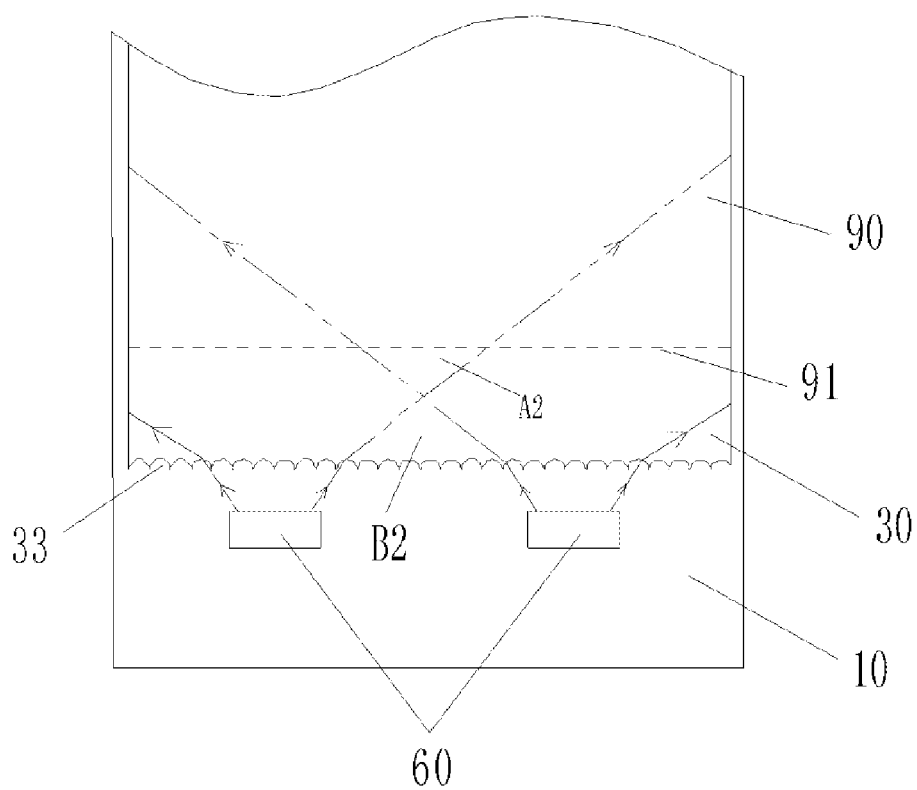
FIG. 15 shows the frontlight effect of a frontlight electronic paper display according to another preferable embodiment of the present invention.
Figure 16:
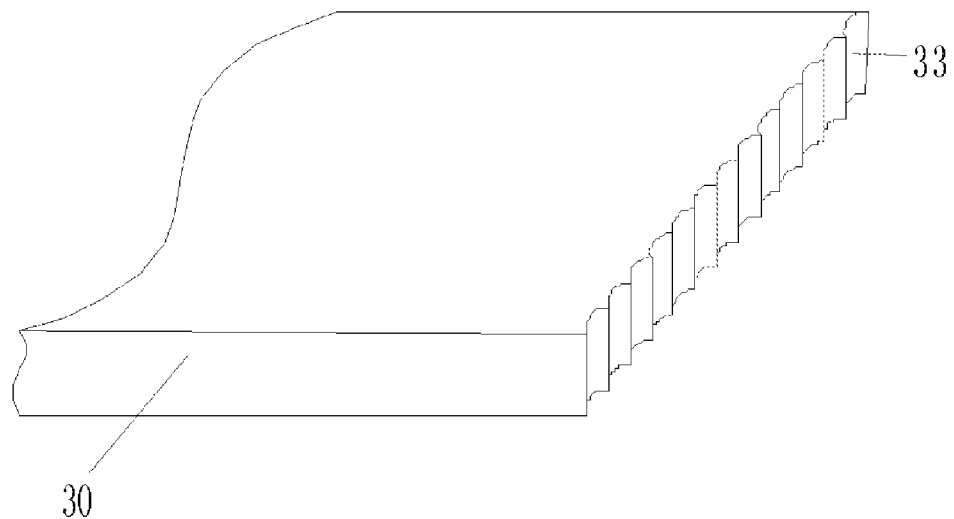
FIG. 16 shows the structure of a light guide plate according to a preferable embodiment of the present invention.
Figure 17:
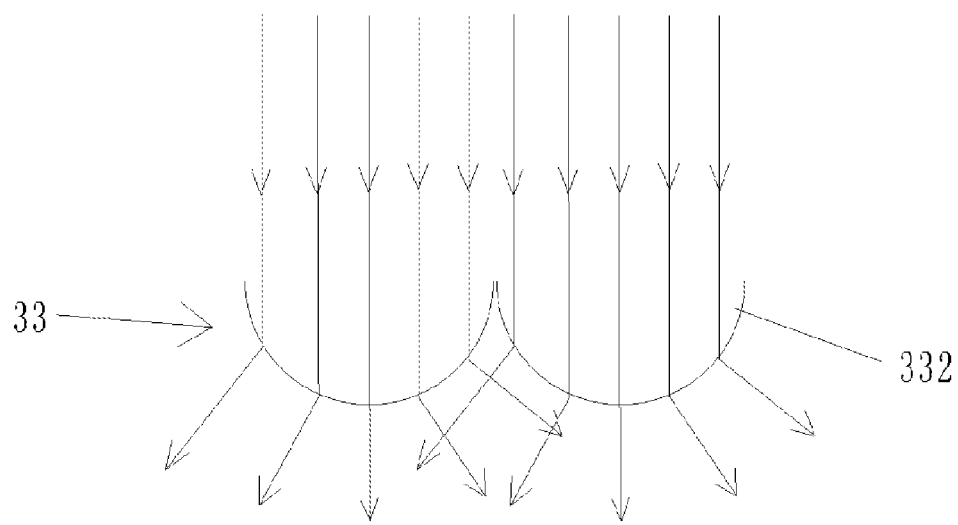
FIG. 17 shows the in-light effect of an in-light surface of the light guide plate in FIG. 16.
Figure 18:
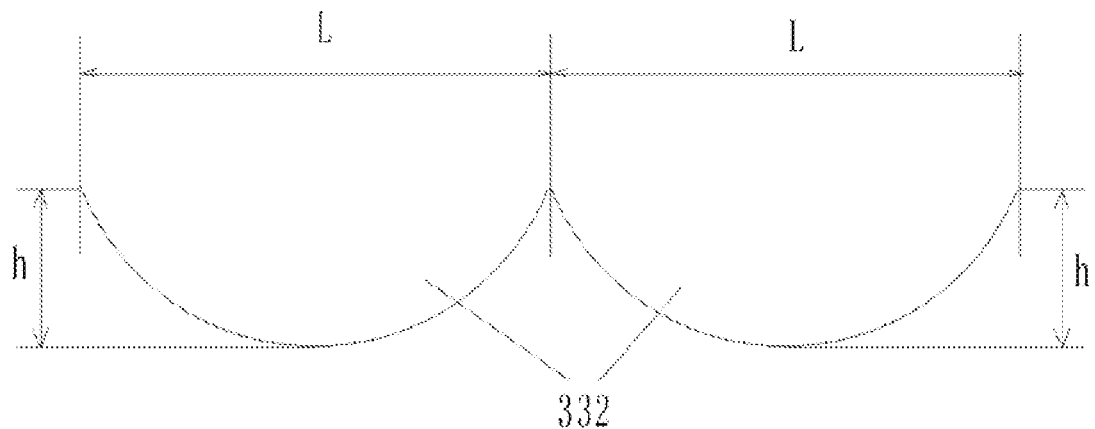
FIG. 18 shows the structure and shape of arc-shaped recesses on the in-light surface of the light guide plate in FIG. 16.

Display area 90 of the electronic paper display is bounded by a dotted line in FIG. 15, which represents an in-light position 91 of the display area 90. The arc-shaped recesses 332 causes light beam to form multiple incident angles on the in-light surface, which leads to different refraction angles. In such a way, the light beam that entered the light guide plate 30 is greatly diffused, which effectively reduces dark area B2, making the dark area B2 away from the display area 90, and enlarges light area A2, making the display area 90 completely inside the light area A2. Therefore, no dark area will appear at the in-light position 91 of an edge of the display area 90 that is close to the in-light surface, thereby providing a better frontlight illumination, and a better display effect in the display area.

Figure 19:
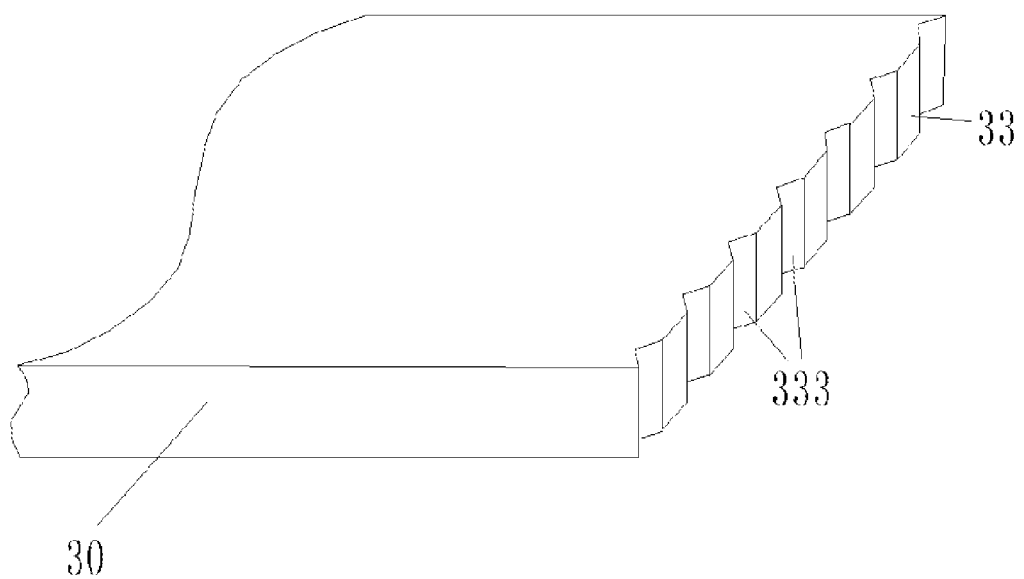
FIG. 19 shows the structure of a light guide plate according to a preferable embodiment of the present invention.
Figure 20:
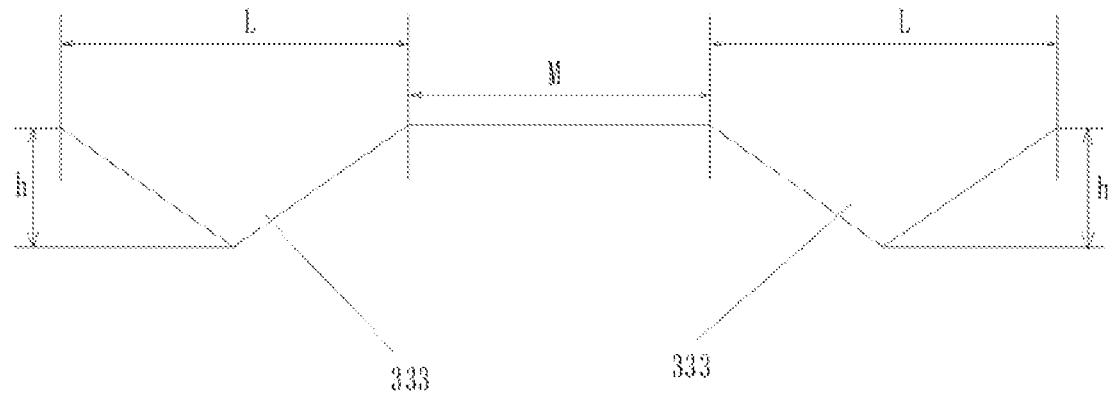
FIG. 20 shows the structure and shape of angle-shaped recesses on the in-light surface of the light guide plate in FIG. 19.

As shown in FIGS. 19-20, in another embodiment of the light guide plate of the electronic paper display, the light guide plate 30 is provided with a tooth-shaped pattern on the in-light surface 33 of its main body. The tooth-shaped pattern is formed by a plurality of angle-shaped recesses 333. The plurality of angle-shaped recesses 333 have a consistent shape and size, and are regularly arranged on the in-light surface 33, which facilitates incoming light beam to uniformly entry the light guide plate through the in-light surface 33.

The height h of the angle-shaped recesses 333 may be provided in the range of 0.05-0.25 mm, for example, 0.05 mm, 0.1 mm, 0.12 mm, 0.15 mm, 0.2 mm, 0.25 mm, and the like, and preferably in the range of 0.1-0.15 mm. The width L of the angle-shaped recesses 333 may be provided in the range of 0.1-0.5 mm, for example, 0.1 mm, 0.2 mm, 0.25 mm, 0.3 mm, 0.4 mm, and the like, and preferably in the range of 0.2-0.3 mm. The distance between two adjacent angle-shaped recesses 333 may be provided in the range of 0-0.5 mm, for example, 0 mm, 0.05 mm, 0.1 mm, 0.2 mm, 0.3 mm, 0.4 mm, 0.5 mm, and the like, and preferably in the range of 0.1-0.3 mm.

The angle-shaped recesses 333 causes light beam to form multiple incident angles on the in-light surface, which leads to different refraction angles. In such a way, the light beam that entered the light guide plate 30 is greatly diffused, thereby providing a better frontlight illumination, and a better display effect in the display area.

As shown in FIGS. 6-9, in another embodiment, the electronic paper display comprises an electronic paper display module 10, an OCA layer 20, a light guide plate 30, an adhesive layer 40, a driving circuit board 50, and LEDs 60. The light guide plate 30 is arranged on a display surface of the electronic paper display module 10. The OCA layer 20 is arranged between the electronic paper display module 10 and the light guide plate 30, for attaching the light guide plate 30 to the display surface of the electronic paper display module 10. One end of the driving circuit board 50 is attached to the light guide plate 30 through the adhesive layer 40, while the other end of it serves for installing LEDs 60.

Figure 6:
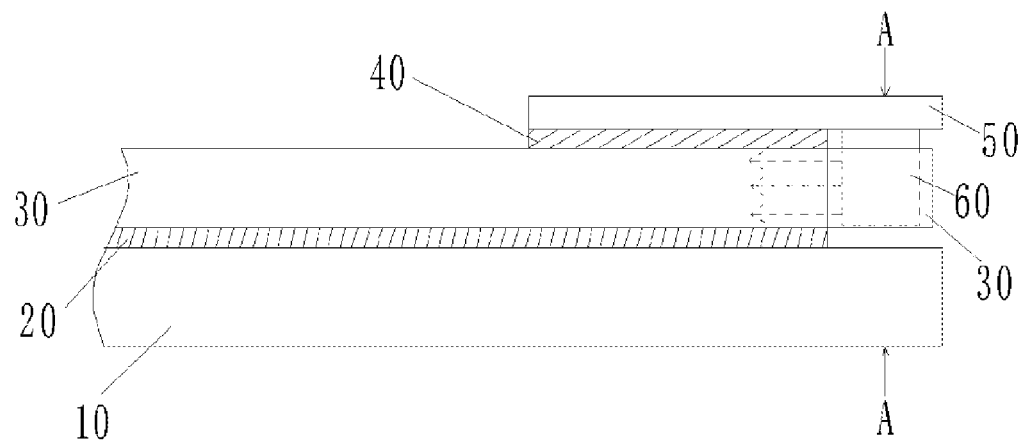
FIG. 6 shows the structure of a frontlight electronic paper display according to another preferable embodiment of the present invention.
Figure 7:
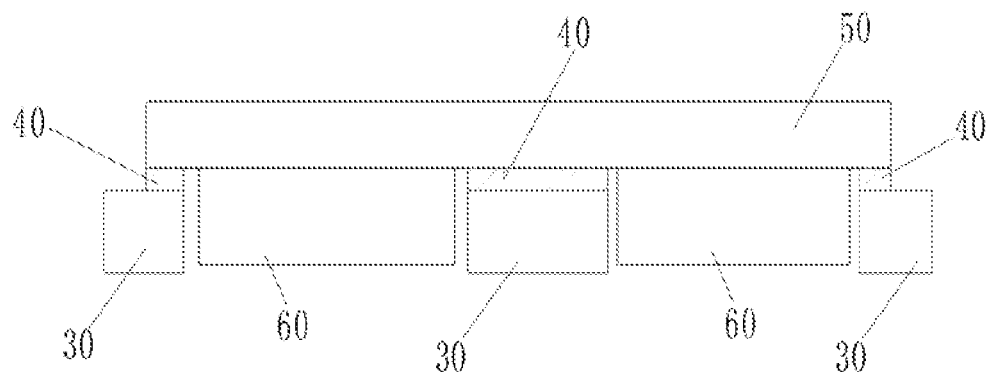
FIG. 7 shows a cross section in the A-A direction of the electronic paper display in FIG. 6.
Figure 8:
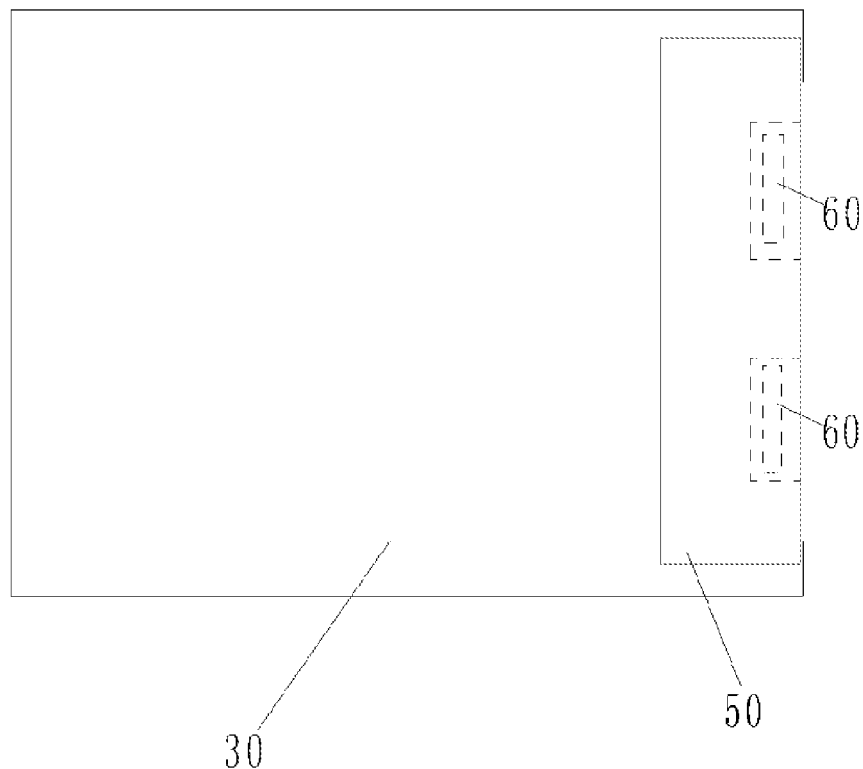
FIG. 8 shows the structure of the frontlight device in FIG. 6.
Figure 9:
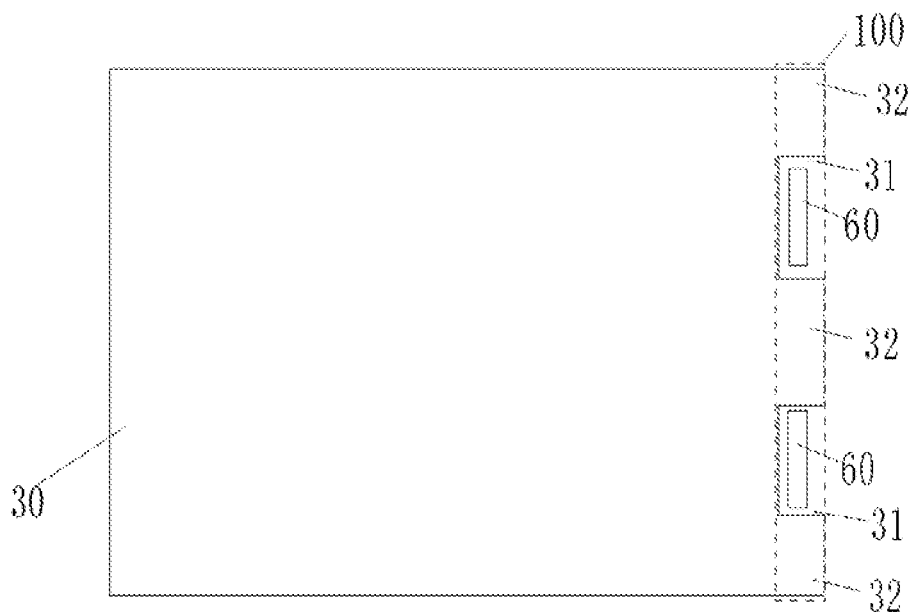
FIG. 9 shows the position relationship of the LEDs and the light guide plate in FIG. 6.

As shown in FIGS. 6-8, the light guide plate 30, the driving circuit board 50, and the LEDs 60 together form a frontlight device of the electronic paper display. A light bar is formed by one or more LEDs 60 weld on the driving circuit board 50. The light guide plate 30 is adapted for attaching on a display surface of the electrophoretic display module 10 and it comprises a main body, which extends into a LED area 100 by a prolonged extension. The LED area 100 is intended to comprise a position where the LED is located and its adjacent area, and for example, it may be the dotted area as shown in FIG. 9. In the case that there are two or more LEDs, the LED area 100 also comprises area between the LEDs. The main body of the light guide plate is provided with recesses 31 for receiving LEDs 60. The LEDs are received inside the recesses 31 of the light guide plate 30, in such a way that the main body of the light guide plate extends into the LED area 100.

The arrangement that the LEDs are received inside the recesses 31 can prevent the LEDs 60 from being impacted or crushed, so as to position the LEDs 60 to avoid any displacement. In addition, since the light guide plate 30 extends into the LED area 100, the driving circuit board 50 can be supported by edges 32 of the recesses of the light guide plate 30, such that displacement of the LEDs 60 due to upwarping of the driving circuit board 50 can be avoided. Furthermore, light leakage of the LEDs 60 can be effectively reduced by the light guide plate 30 extending into the LED area 100.

The recess 31 runs through the main body of the light guide plate from its upper surface to its lower surface, which facilitates machining of the recess 31 and also receiving of the LED inside the recess 31. The LED 60 is of a long strip shape, which broadens lightening surface of the LED, i.e., it provides the light guide plate with a wider lightening. The recess 31 has a shape and size corresponding to that of the LED 60, i.e., the recess 31 can also be formed into a long strip shape, with a depth corresponding to width of the LED 60. In this way, the top of the LED 60 is aligned to opening of the recess 31.

Figure 14:
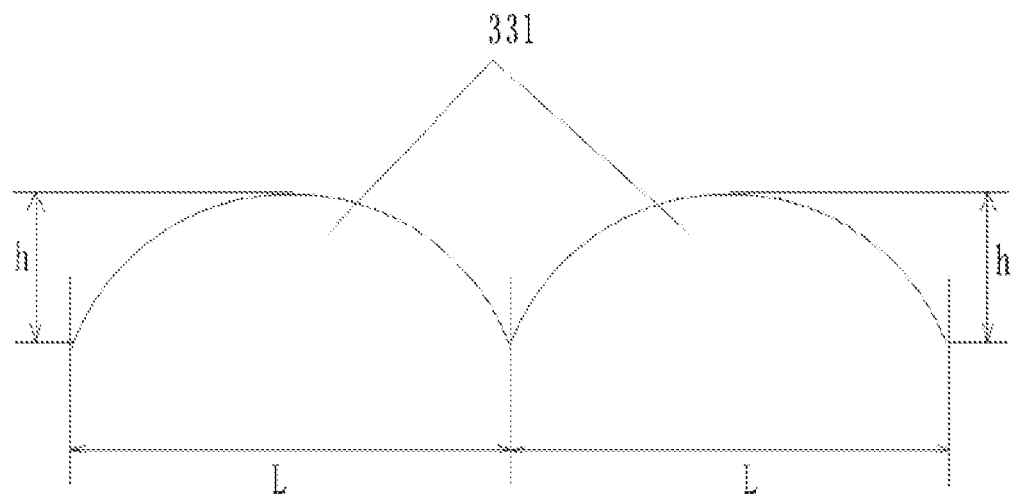
FIG. 14 shows the structure and shape of arc-shaped projections on the in-light surface of the light guide plate in FIG. 12.
Figure 21:
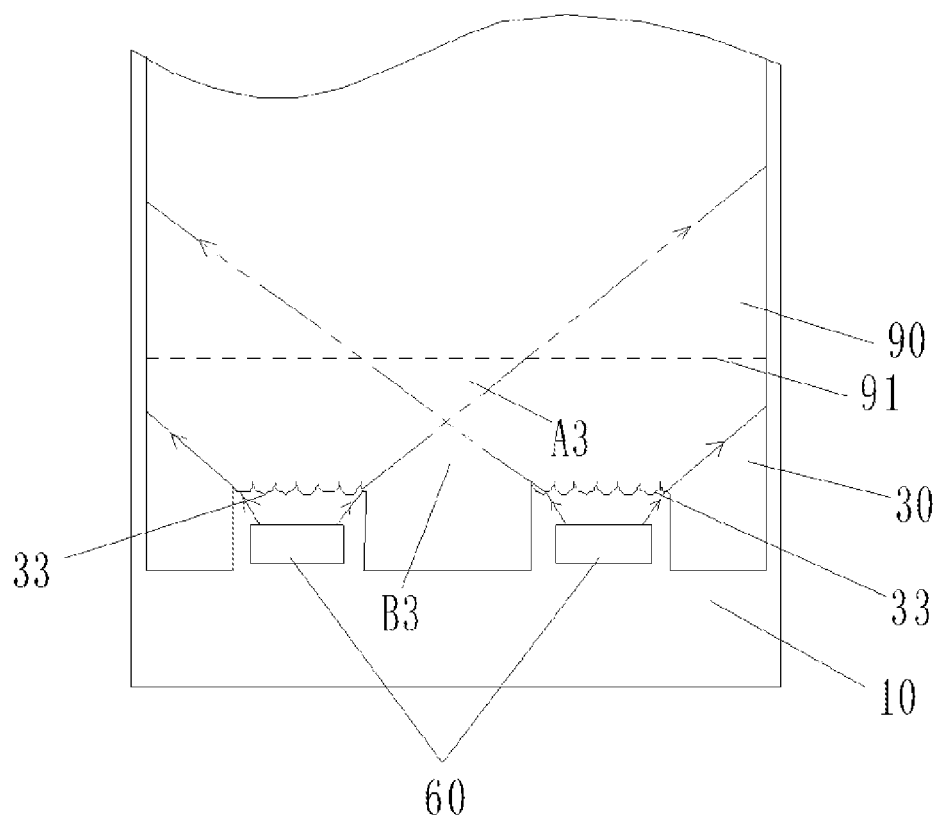
FIG. 21 shows the frontlight effect of a frontlight electronic paper display according to another preferable embodiment of the present invention.
Figure 22:
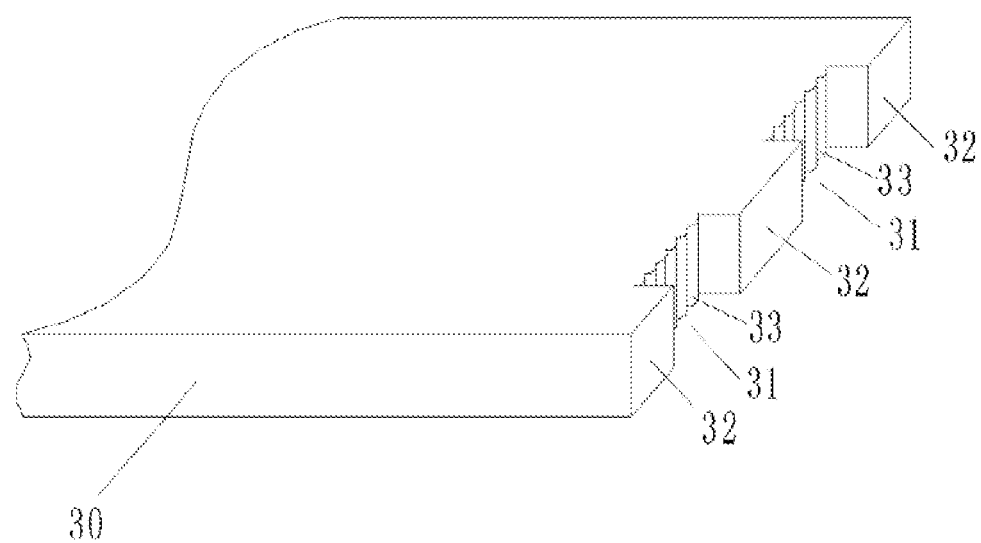
FIG. 22 shows the structure of a light guide plate according to a preferable embodiment of the present invention.

As shown in FIGS. 21-22 and 14, in-light surfaces 33 of the light guide plate 30 are provided at bottom of the recesses 31. In one embodiment, the in-light surface 33 is provided with a tooth-shaped pattern, which is formed by a plurality of arc-shaped projections 331. The plurality of arc-shaped projections 331 have a consistent shape and size, and are regularly arranged on the in-light surface 33, which facilitates incoming light beam to uniformly entry the light guide plate through the in-light surface 33.

The height h of the arc-shaped projections 331 may be provided in the range of 0.05-0.25 mm, for example, 0.05 mm, 0.1 mm, 0.12 mm, 0.15 mm, 0.2 mm, 0.25 mm, and the like, and preferably in the range of 0.1-0.15 mm. The width L of the arc-shaped projections 331 may be provided in the range of 0.1-0.5 mm, for example, 0.1 mm, 0.2 mm, 0.25 mm, 0.3 mm, 0.4 mm, and the like, and preferably in the range of 0.2-0.3 mm. The distance between two adjacent arc-shaped projections 331 may be provided in the range of 0-0.5 mm, for example, 0 mm, 0.05 mm, 0.1 mm, 0.12 mm, 0.15 mm, 0.2 mm, 0.25 mm, 0.3 mm, 0.4 mm, 0.5 mm, and the like, and preferably in the range of 0-0.1 mm.

As shown in FIGS. 21 and 13, display area 90 of the electronic paper display is bounded by a dotted line in FIG. 21, which represents an in-light position 91 of the display area 90. The arc-shaped projections 331 causes light beam to form multiple incident angles on the in-light surface, which leads to different refraction angles and therefore makes the light beam to aggregate inside the light guide plate and then diverge again. In such a way, the light beam that entered the light guide plate 30 is greatly diffused, which effectively reduces dark area B3, making the dark area B3 away from the display area 90, and enlarges light area A3, making the display area 90 completely inside the light area A3. Therefore, no dark area will appear at the in-light position 91 of an edge of the display area 90 that is close to the in-light surface, thereby providing a better frontlight illumination, and a better display effect in the display area.

Of course, in other embodiments, the tooth-shaped pattern may also be formed by a plurality of arc-shaped recesses, or a plurality of angle-shaped recesses or a plurality of angle-shaped projections.

Of course, in other embodiments, the adjacent arc-shaped recesses, arc-shaped projections, angle-shaped recesses or angle-shaped projections may be connected with each other or have a certain interval.

Of course, in other embodiments, the LEDs may be provided in a number of 1 or 2 or more, for example, 3 or 4 or the like.

It should be understood that the above embodiments are only preferable examples of the present invention, and therefore are not limiting the scope of the present invention. All equivalent structures or steps based on the specification and figures of the present invention, or their direct or indirect application in other related technical fields, are in the same way comprised in the scope of the present invention.

What is claimed is:

1. An electronic paper display, comprising
   [a] an electrophoretic display module, emission thereon is caused by a reflective light gathered by a light guide plate, having a display surface,
   [b] the light guide plate arranged above the display surface of the electrophoretic display module, configured to transmit emission from a frontlight device and ambient light, redirect to electrophoretic display module, and having a top surface, a bottom surface, and a side, wherein
      the bottom surface faces towards the display surface, the top surface is an opposite surface of the bottom surface, the side connecting the top surface and bottom surface, positioned above the display surface;

[c] a tooth shaped pattern is formed on an exterior surface of the side of the light guide plate and extended from the top surface to the bottom surface of the light guide plate;

said frontlight device, including at least two LEDs and a distance separating adjacent LEDs, and arranged above the electrophoretic display module, wherein a dark area is formed by light emitted by adjacent LEDs,

[d] wherein the light guide plate has a first continuous portion, having only bright areas, corresponding to a display area of the electronic paper display and being distal to the frontlight device, and a second continuous portion, having a bright area and dark area, corresponding to a non-display area of the electronic paper display and adjacent to the frontlight device,

[e] wherein the tooth shaped pattern formed on the exterior surface of the side has an in-light surface facing directly to the frontlight device, and

[f] when light beams emitted by the frontlight device incident into the light guide plate through the in-light surface, different angles of refraction are generated, light beams are gathered in the light guide plate and then diverged, thereby greatly diffusing the light beams entering the light guide plate, effectively reducing the range of the dark area, and keeping the dark area away from a center of the guide plate along its length direction and being restricted in the second continuous portion.

2. The electronic paper display of claim 1, wherein the electrophoretic display module comprises successively a substrate layer, a microcapsule electrophoretic display layer, and a transparent electrode layer.

3. The electronic paper display of claim 1, wherein the tooth shaped pattern is formed by a plurality of arc-shaped projections, a plurality of arc-shaped recesses, a plurality of angle-shaped projections, or a plurality of angle-shaped recesses.

4. The electronic paper display of claim 1, wherein a width of the arc-shaped projections, arc-shaped recesses, angle-shaped projections, or angle-shaped recesses is in a range of 0.1-0.5 mm.

5. The electronic paper display of claim 4, wherein the width of the arc-shaped projections, arc-shaped recesses, angle-shaped projections, or angle-shaped recesses is in a range of 0.2-0.3 mm.

6. The electronic paper display of claim 3, wherein a height of the arc-shaped projections, arc-shaped recesses, angle-shaped projections, or angle-shaped recesses is in a range of 0.05-0.25 mm.

7. The electronic paper display of claim 6, wherein the height of the arc-shaped projections, arc-shaped recesses, angle-shaped projections, or angle-shaped recesses is in a range of 0.1-0.15 mm.

8. The electronic paper display of claim 3, wherein a distance between two adjacent arc-shaped projections, arc-shaped recesses, angle-shaped projections, or angle-shaped recesses is in a range of 0-0.5 mm.

9. The electronic paper display of claim 1, wherein the light guide plate extends into an area of the at least two LEDs and is provided with recesses for receiving the at least two LEDs.

10. The electronic paper display of claim 1, further comprises a PCB board to control the frontlight device, placed above the light guide plate.

11. The electronic paper display of claim 1, wherein each LED's emission coverage exceeds an individual arc-shaped projection, arc-shaped recess, angle-shaped projection, and angle-shaped recess.

* * * * *